United States Patent
diGirolamo et al.

(10) Patent No.: US 7,596,921 B1
(45) Date of Patent: *Oct. 6, 2009

(54) STUD SPACER WITH INTERLOCKING PROJECTIONS

(75) Inventors: Edward R. diGirolamo, Releigh, NC (US); Michael Torres, Raleigh, NC (US); Thomas Trestain, Toronto (CA)

(73) Assignee: The Steel Network, Inc., Raleigh, NC (US)

( * ) Notice: Subject to any disclaimer, the term of this patent is extended or adjusted under 35 U.S.C. 154(b) by 1009 days.

This patent is subject to a terminal disclaimer.

(21) Appl. No.: 10/701,190

(22) Filed: Nov. 4, 2003

(51) Int. Cl.
*E04C 3/02* (2006.01)

(52) U.S. Cl. .............. 52/696; 52/633; 52/636; 52/637; 52/664; 52/665; 52/666; 52/667; 52/668; 52/669; 403/253; 403/335; 248/57; 248/168

(58) Field of Classification Search ........... 52/317, 52/653.1, 655.1, 696, 712, 714, 715, 726.2, 52/664–668, 506.01, 506.1, 506.06, 506.07, 52/506.08, 506.09, 633, 636–637, 646, 648.1, 52/643, 321; 403/346–347, 388, 253, 335; 248/57, 168
See application file for complete search history.

(56) References Cited

U.S. PATENT DOCUMENTS

| 719,191 | A | * | 1/1903 | Collins | 52/348 |
|---|---|---|---|---|---|
| 893,818 | A | * | 7/1908 | Schutt | 52/696 |
| 1,867,449 | A | * | 7/1932 | Ecket et al. | 52/100 |
| 3,083,794 | A | * | 4/1963 | Stovall, Jr. | 52/364 |
| 3,363,392 | A | * | 1/1968 | Boughner | 52/715 |
| 3,445,977 | A | * | 5/1969 | Latiano | 52/713 |
| 3,778,952 | A | * | 12/1973 | Soucy | 52/667 |
| 3,979,874 | A | * | 9/1976 | Cubbler et al. | 52/664 |
| 4,007,570 | A | * | 2/1977 | Hunter | 52/317 |
| 4,677,802 | A | * | 7/1987 | Vukmanic | 52/506.07 |
| 4,791,766 | A | * | 12/1988 | Egri, II | 52/317 |
| 4,840,005 | A | * | 6/1989 | Cochrane | 52/667 |
| 4,912,894 | A | * | 4/1990 | Platt | 52/98 |
| 5,070,666 | A | * | 12/1991 | Looman | 52/239 |
| 5,274,973 | A | * | 1/1994 | Liang | 52/243 |
| 6,164,028 | A | * | 12/2000 | Hughes | 52/317 |
| 6,393,794 | B1 | * | 5/2002 | Pellock | 52/696 |
| 6,694,695 | B2 | * | 2/2004 | Collins et al. | 52/568 |
| 6,701,689 | B2 | * | 3/2004 | diGirolamo | 52/667 |
| 6,729,100 | B2 | * | 5/2004 | Koski et al. | 52/726.2 |
| 7,017,310 | B2 | * | 3/2006 | Brunt | 52/220.1 |

* cited by examiner

*Primary Examiner*—Jeanette Chapman
(74) *Attorney, Agent, or Firm*—Coats & Bennett, P.L.L.C.

(57) ABSTRACT

A stud spacer for use in a wall structure. The stud spacer includes a pair of opposed projections. The respective projections of the stud spacer interconnect with similar projections from adjacent stud spacers to form an interconnected series of stud spacers that extend through the studs that comprise the wall structure. When connected, each projection extends through an opening in an adjacent projection and a locking surface or locking tab associated with one projection seats in or against a stop or seat formed in the other projection.

41 Claims, 3 Drawing Sheets

STUD SPACER WITH INTERLOCKING PROJECTIONS

FIELD OF THE INVENTION

The present invention relates to light metal stud walls and more particularly to a stud spacer adapted to be interconnected between respective studs forming a part of the wall structure.

BACKGROUND OF THE INVENTION

Metal studs are commonly used to form wall structures that can be load bearing or non-load bearing. Typically such wall structures include a plurality of metal studs connected between upper and lower metal tracks. Generally, the lower track is secured to a floor structure while the upper track is generally connected to an overhead structure. Wallboards and other types of interior wall materials can be secured to the sides of the studs. Metal wall structures are designed to withstand a variety of loads. For example, there can be load bearing loads imposed on the studs of the wall structure from an overhead load. Further, wall structures may be designed to withstand non-load bearing conditions such as wind and seismic loads. In any event, these load bearing and non-load bearing forces will generally act as vertical and horizontal loads on the wall studs. These loads, in some cases, can result in damage to the studs and the finishes secured to the studs if the wall structure is not properly braced.

This problem has been addressed in the past by providing lateral structural bracing to support the studs in the weak direction. Generally, such lateral structural bracing is secured to one side of the stud wall and directly to the studs and extends diagonally across the studs. However, such bracing structures are relatively expensive and require significant labor to install.

In other cases, it is known to include spacer bars extending through openings formed in the studs. However, many spacer bar designs are difficult to install and in the end do not yield substantial strength and rigidity.

Therefore, there has been and continues to be a need for a stud spacer system that is easy to install and which provides substantial strength and rigidity to the wall structure comprising the studs and which effectively aids the studs in withstanding both load bearing and non-load bearing forces.

SUMMARY OF THE INVENTION

The present invention relates to a stud spacer that is adapted to extend between two studs in a wall structure. The stud spacer includes a main member adapted to extend between the two studs with the main member including first and second end portions. A projection extends from each end portion. The projections of the main member are adapted to interlock with similar projections of other stud spacers so as to effectively interlock the stud spacer with adjacent stud spacers.

Further, in one embodiment of the present invention a stud spacer assembly is provided and which extends between a series of studs. The stud spacer assembly includes at least first and second stud spacers with the first stud spacer including a first projection and a second stud spacer including a second projection. When the two stud spacers are connected, the first and second projections interlock to connect the first and second stud spacers together. Each projection of the stud spacer includes a locking surface and a stop and wherein when interlocked, the locking surface of the first projection is engaged with the stop of the second projection and the locking surface of the second projection is engaged with the stop of the first projection.

Also the present invention entails a wall structure comprising a series of spaced apart studs with each stud having an opening formed therein. A series of stud spacers extend between respective studs. Each stud spacer includes first and second projections that extend from opposite ends of the stud spacer. The first and second projections of each stud spacer are adapted to connect to first and second projections of other stud spacers so as to interconnect the stud spacers in the wall structure. Each projection includes a locking surface and a stop and wherein when connected the locking surface of the first projection is engaged with the stop of the second projection and the surface of the second projection is engaged with the locking stop of the first projection.

In one particular embodiment of the present invention, each projection includes a terminal end portion having the locking surface associated therewith, an opening and a stop or locking stop. When a pair of projections are interconnected, the terminal end of one projection is inserted through the opening of the other projection and the terminal end of the other projection is inserted into the opening of the one projection and the locking surfaces seat or rest against the locking stop which effectively interlocks the two projections together.

Other objects and advantages of the present invention will become apparent and obvious from a study of the following description and the accompanying drawings which are merely illustrative of such invention.

DESCRIPTION OF EXEMPLARY EMBODIMENT

Figure 1:
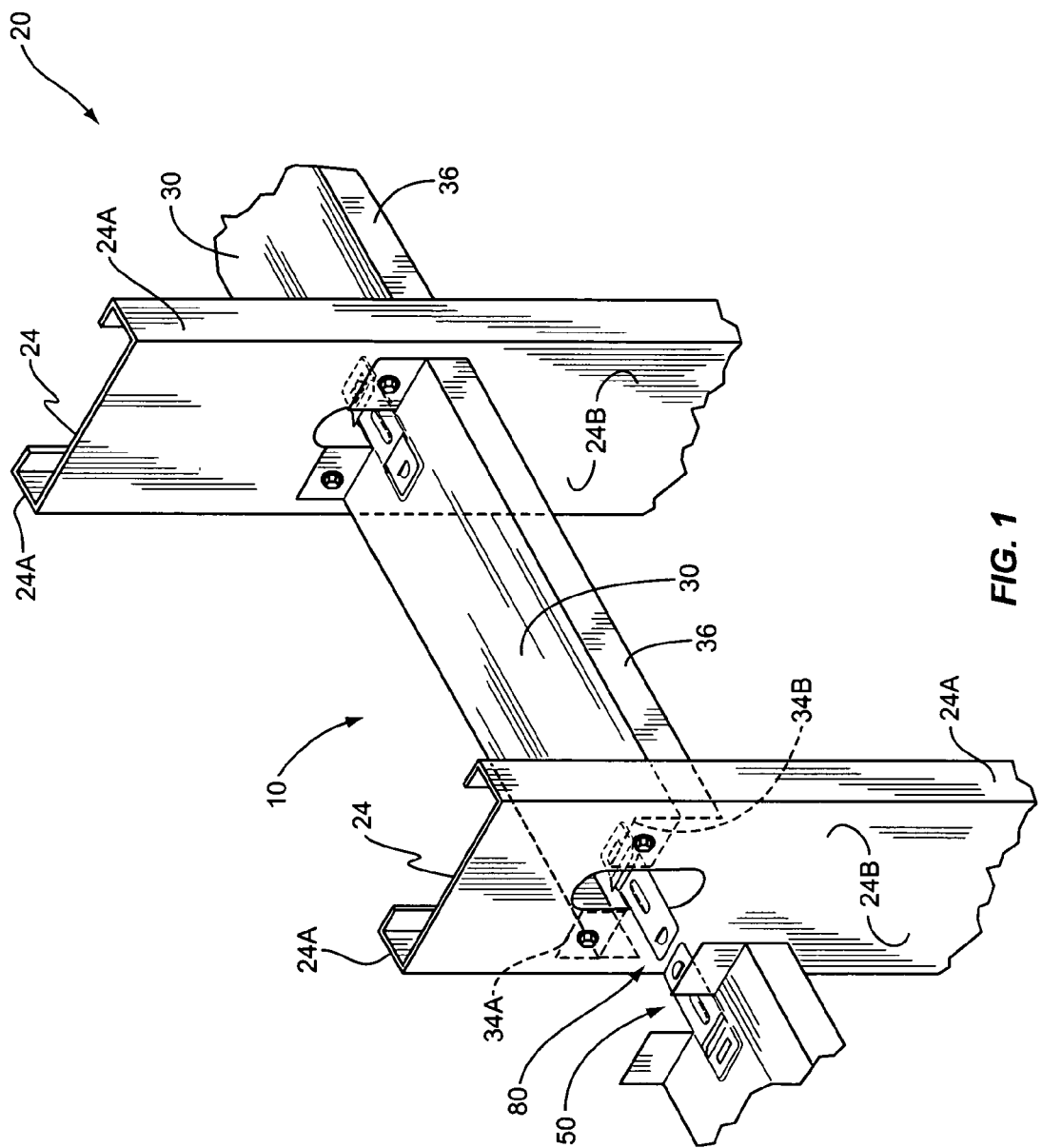
FIG. 1 is a fragmentary perspective view of a portion of the wall structure showing the stud spacers of the present invention connected therein.

With further reference to the drawings, the stud spacer of the present invention is shown therein and indicated generally by the numeral 10. In FIG. 1 there is shown a wall section indicated generally by the numeral 20. Wall section 20 includes a series of the stud spacers. Stud spacers 10 extend between a series of studs 24. As seen in FIG. 1, each stud includes a pair of flanges 24A and a web 24B. Formed in the web 24B is an opening. As will be appreciated from subsequent portions of the disclosure, portions of the respective stud spacers 10 will project through the openings within the webs 24B so as to effectively interconnect the stud spacers 10.

Continuing to refer to FIG. 1, each stud spacer 10 includes a main member or central section 30. Central section 30 extends between a pair of side flanges 36. Additional strength can be incorporated into the central section 30 by providing elongated ribs (not shown) that maybe formed in the central section 30 and which run parallel with the flanges 36.

Also, in the embodiment illustrated herein, each stud spacer 10 includes a pair of end flanges 34A and 34B disposed on opposite ends of the stud spacer. End flanges 34A and 34B extend in a plane generally normal to the plane of the central section 30. As seen, the end flanges 34A and 34B are divided such that when the stud spacers 10 are incorporated in the wall structure 20, the spacing between the flanges 34A and 34B will align with the openings formed in the webs 24B of the studs 24.

Flanges 34A and 34B can be secured by fasteners to the webs 24B of the studs 24 that form a part of the wall structure 20. Accordingly, each flange 34A and 34B includes an opening for receiving a fastener such as a screw. Screws are extended through the openings in the flanges 34A and 34B and into the adjacent webs 24B so as to effectively anchor and secure each stud spacer 10 between two studs 24 as shown in FIG. 1.

The above description of the stud spacer 10 simply describes one general design for the main portion or main member of the stud spacer. It is appreciated that the particular design of the central section or main member 30 can vary and that certain design features such as the flanges discussed above are not essential to the design.

Stud spacer 10 is designed such that when a series of stud spacers are incorporated into a wall structure 20 that the respective stud spacers can be interconnected together. To accommodate this function, the stud spacer 10 is provided with structure that enables the respective stud spacers to be linked or connected end-to-end when the stud spacers are employed within the wall structure 10. In the embodiment illustrated herein, this interconnecting structure entails a projection or tongue that extends from opposite ends of each stud spacer 10. As will be discussed in more detail below, when a series of stud spacers 10 are incorporated into a wall structure 10 the individual projections will extend from one stud spacer to another stud spacer and interconnect with a similar projection associated with the other stud spacer.

As illustrated in the drawings, each stud spacer 10 includes opposite end portions and secured or formed on opposite end portions of each stud spacer is a pair of projections. This pair of projections is referred to as a first projection, indicated generally by the numeral 50, and a second projection indicated generally by the numeral 80.

Figure 2A:
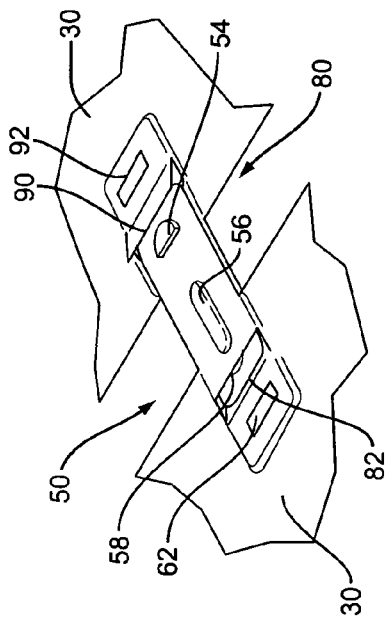
FIG. 2A is a fragmentary schematic illustration showing the projections extending from a pair of stud spacers prior to the projections being interconnected.
Figure 2B:
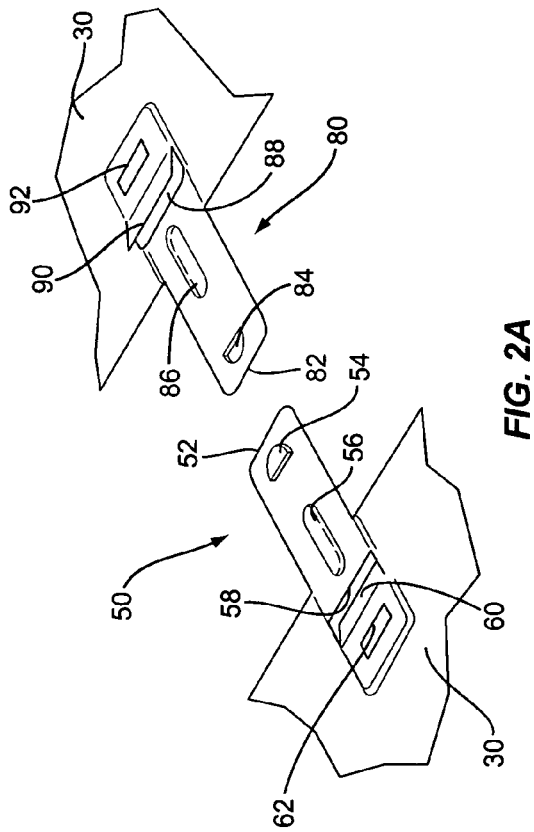
FIG. 2B is a view similar to FIG. 2A but showing the projections being brought together prior to the projections being actually interlocked.

With reference to FIGS. 2A-2B, the first projection basically comprises a tab or a tongue that extends outwardly from an end portion of the stud spacer 10. First projection 50 includes a terminal end 52. Formed on the terminal end is a locking surface and as will be understood from subsequent portions of this disclosure, the locking surface functions to engage a portion of another projection and this engagement will result in the two projections being interlocked or locked together. In the case of this embodiment, the locking surface formed on the first projection 50 is in the form of a locking tab 54. Locking tab 54 is raised or elevated with respect to the upper surface of the first projection 50.

Figure 3A:
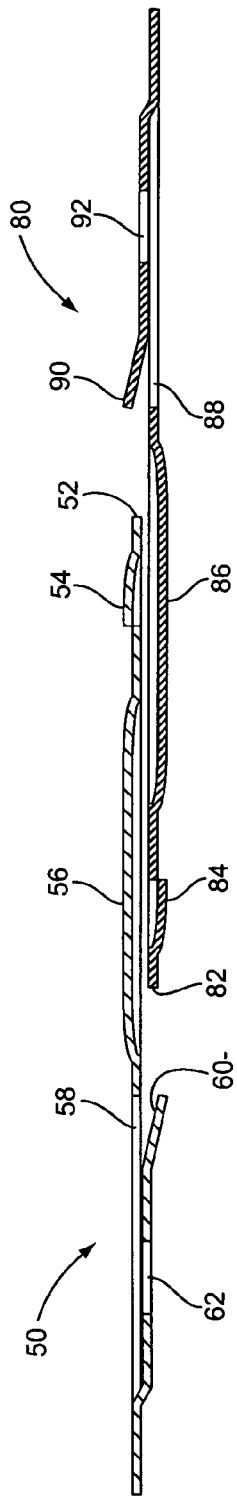
FIG. 3A is a schematic sectional view illustrating the two projections of a pair of stud spacers being brought together.
Figure 3B:
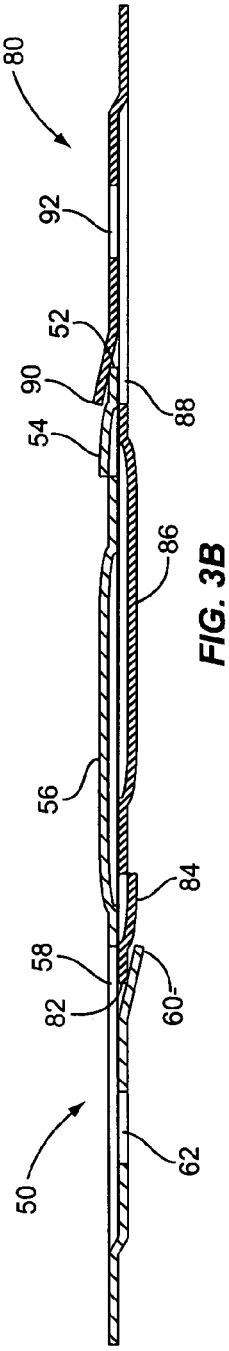
FIG. 3B is a schematic sectional view similar to FIG. 3A but wherein the interlocking process has advanced from that shown in FIG. 3A.
Figure 3C:
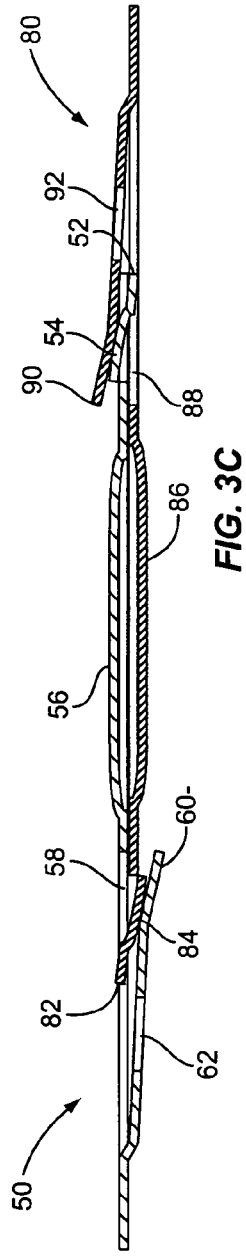
FIG. 3C is a schematic sectional view similar to FIGS. 3A and 3B but wherein the interlocking process is even further advanced.

Disposed inwardly of the locking tab 54 is an elongated reinforcing rib 56. Rib 56 basically imparts strength and rigidity to the projection 50. Disposed inwardly or towards the main section 30 of the stud spacer 10 is a transverse opening 58. Disposed adjacent the opening is a deflector 60. Deflector 60 in this embodiment is disposed on the inward side of the opening 58 and is directed downwardly as viewed in FIGS. 2A and 3A.

Disposed inwardly of the opening 58 and deflector 60 is a stop that may be sometimes referred to as a locking stop. As discussed above, the function of the projections 50 and 80 are to connect or interlock the respective stud spacers 10 together. The stop formed on the projections will cooperate with the locking surface described above to actually interlock or lock the two projections together. In the case of this embodiment and with reference to the first projection 50, the stop is in the form of an opening 62 that is sometimes referred to as a tab receiving opening 62 so as to distinguish the latter from opening 58. In any event, the opening 62, as viewed in FIG. 2A, is of a general rectangular configuration.

Besides the first projection 50, just described, each stud spacer will include the second projection 80. Projections 50 and 80 will be disposed on opposite ends of each stud spacer 10. The basic construction of the second projection 80 will be similar to the basic construction of the first projection 50. However, in order that first and second projections may mate and interlock, it will be seen that the particular orientation of some of the components will be slightly different. In any event, second projection 80, similar to first projection 50, includes a terminal end 82. Disposed inwardly of the terminal end is a locking surface in the form of a locking tab 84. In this case, the locking tab 84 is indented into the surface of the second projection. Contrasted with the locking tab 54 of the first projection 50, the locking tab 84 of the second projection 80 is raised with respect to the lower surface of the second projection 80, as viewed in FIG. 2A. That is the locking tab 84 projects downwardly from the underside from the second projection.

Like the first projection 50, the second projection 80 includes a reinforcing rib 86. The reinforcing rib 86 is disposed opposite the reinforcing rib 56 found on the first projection. Again, rib 86 will impart strength and rigidity to the second projection 80.

Disposed inwardly of the rib 86 is a transverse opening 82. Disposed on the inward side of the opening 82 is a deflector 90. Note that deflector 90 extends upwardly at an angle on the second projection 80. See FIGS. 2A and 3A. Finally, the second projection 80 includes a stop or locking stop. In particular, the stop is in the form of a tab receiving opening 92 that is formed adjacent the deflector 90.

The first and second projections are of course arranged on the stud spacers such that when the stud spacers are aligned for connection, that a first projection 50 will be disposed adjacent a second projection 80 for the purpose of interlocking or interconnecting the adjacent stud spacers. Basically to connect the first and second projections 50 and 80 together, one projection will be moved over the other and in the course of doing that the terminal ends 52 and 82 of the projections will contact the respective deflectors 60 and 90. When the terminal ends 52 and 82 contact the deflectors, the construction of the projections will permit the terminal end portions of these projections to slightly flex. As the projections are continued to be pushed together, the terminal ends 52 and 82, as a result of engaging the deflectors 60 and 90 will slightly turn and move through the openings 58 and 88. Then as the projections are continued to be pushed together once the terminal end portions have reached a certain point the locking tabs 54 and 84 of the respective projections will tend to simply snap or move into engagement with the tab receiving openings 62 and 92. This achieves a locked or interlocked condition.

With particular reference to FIGS. 2A-2D and 3A-3D, the locking or interlocking process will be described in more detail. In FIG. 2A, a pair of stud spacers are spaced apart. Note the first projection 50 and the second projection 80. In this situation, the projections are going to be brought together and interlocked. The first projection 50 will ride over the second projection 80. This is illustrated in FIG. 2B. As the two projections are continued to be brought together, the terminal end 52 of the first projection 50 will approach the upwardly directed deflector 90 of the second projection. Likewise, the terminal edge 82 of the second projection that underlies the first projection 50 will be approaching the downwardly oriented deflector 60 of the first projection.

Figure 2C:
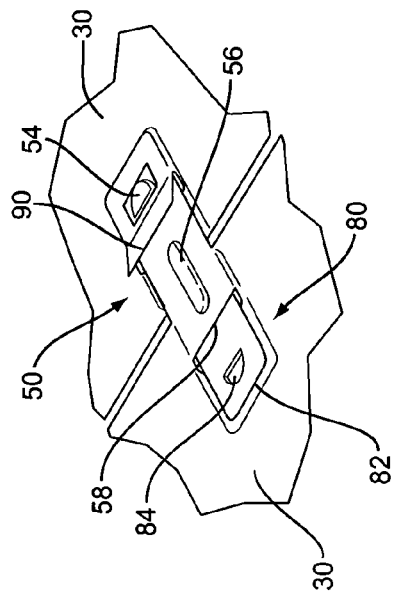
FIG. 2C is a view similar to FIG. 2B but showing a further progression of the projections being connected together.
Figure 2D:
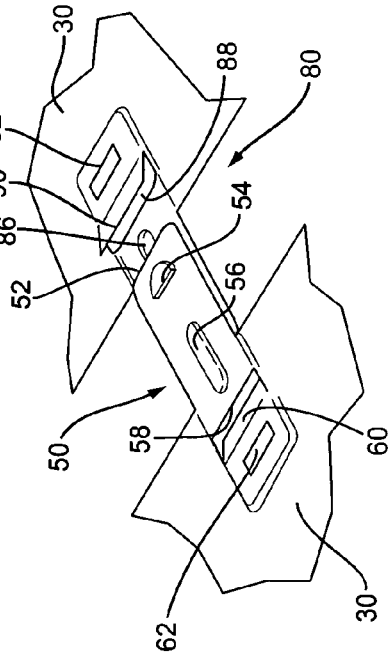
FIG. 2D is a view similar to FIGS. 2A-2C but wherein the two projections extending from the pair of stud spacers have been interconnected and effectively locked together.
Figure 3D:
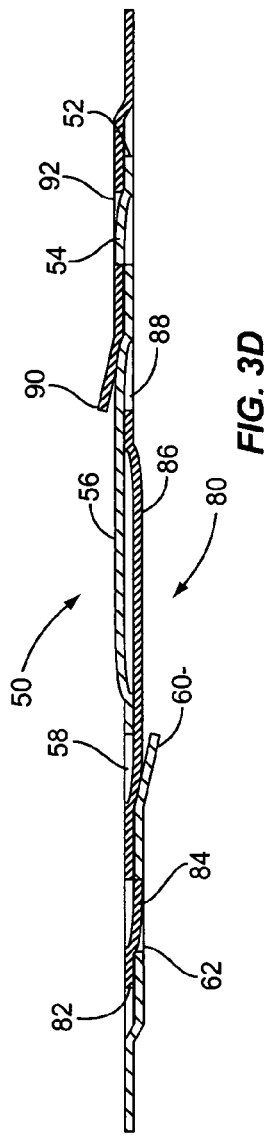
FIG. 3D is a schematic sectional view similar to FIGS. 3A-3C but wherein the two projections are disposed in an interlocked position.

FIG. 2C illustrates the engagement of the terminal edge 52 with the deflector 90 and the engagement of the terminal edge 82 with deflector 60. At the point illustrated in FIG. 2C, the two projections cannot continue to move together unless the terminal end portions of the respective projections are deflected such that the terminal end portions move through the respective openings 58 and 88 of the two projections. However, as noted above, the two terminal end portions of the projections will deflect and pass through the respective openings 58 and 88. Once the terminal end portions have slightly cleared the openings 58 and 88, then the tendency will be for the terminal end portions to spring back. This results, in the case of the first projection 50, in the locking tab 54 snapping or moving into engagement with the tab receiving opening 92 of the second projection. When this happens, the two projections 50 and 80 are locked or interlocked together. That is the locking tab 54 will project upwardly into the opening or seat 92 and a locked condition will exist. Likewise the downwardly projecting locking tab 84 will snap into the tab receiving opening 62 formed in the first projection 50. Once this happens another locked condition is achieved. Thus, there is a double locking of the two projections. This is illustrated in FIGS. 2D and 3D. This clearly forms a very tight and secure locking arrangement that will lock one stud spacer to another stud spacer.

It is appreciated that this locking and securing arrangement can be carried out continuously between consecutive stud spacers 10 and a wall structure 20. That is, one stud spacer 10 after another stud spacer 10 is securely locked together by the locking mechanism just described.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A stud spacer for extending between two studs comprising:
   a. a main member adapted to extend between the two studs;
   b. the main member including first and second end portions;
   c. a projection extending from each end portion;
   d. a pair of spaced apart end flanges extending from each end portion in a direction generally normal to the projection;
   e. wherein the end flanges are disposed on opposite sides of the projection and the projection extends outwardly past the end flanges;
   f. wherein the main member, the projections, and the end flanges form the stud spacer; and
   g. wherein the projections of the main member are configured to interlock with similar projections of other stud spacers.

2. The stud spacer of claim 1 wherein each projection includes a locking surface, an opening, a deflector disposed adjacent the opening, and a stop.

3. The stud spacer of claim 2 wherein when two projections are interlocked, the locking surface of one projection engages the stop of the other projection.

4. The stud spacer of claim 1 wherein each projection is elongated and when connected to a similar projection at least partially overlies or underlies the similar projection.

5. The stud spacer of claim 1 wherein each of the two projections includes a deflectable terminal end and an opening.

6. The stud spacer of claim 1 wherein each projection includes a terminal end portion, a locking tab disposed on the terminal end portion, a deflector disposed inwardly of the locking tab; an opening formed in the projection adjacent the deflector; and a stop disposed inwardly of the opening.

7. A stud spacer assembly for extending between a series of studs, comprising:
   a. at least first and second stud spacers wherein each stud spacer extends between a pair of studs and each having an end portion;
   b. said first stud spacer including a first projection and said second stud spacer including a second projection;
   c. said first and second projections adapted to interlock so as to connect the first and second stud spacers together;
   d. wherein each projection includes a locking surface and a stop and wherein when interlocked, the locking surface of the first projection is engaged with the stop of the second projection and the locking surface of the second projection is engaged with the stop of the first projection;
   d. a pair of spaced apart end flanges extending from each end portion in a direction generally normal to the projections; and
   e. wherein the end flanges are disposed on opposite sides of the projection and the projection extends outwardly past the end flanges.

8. The stud spacer assembly of claim 7 wherein when connected the first and second projections overlie each other.

9. The stud spacer assembly of claim 8 wherein each projection includes an opening and wherein when connected the first projection extends through the opening of the second projection and the second projection extends through the opening of the first projection.

10. The stud spacer assembly of claim 9 wherein at least a portion of each projection is at least slightly yieldable such that a portion of each projection can slightly flex during the course of interconnecting the projections.

11. The stud spacer assembly of claim 7 wherein each projection includes an opening and a deflector and wherein the locking surface of each projection is formed on a terminal end portion of the projection and wherein when connected the terminal end portion of the first projection projects through the opening in the second projection and the terminal end portion of the second projection projects through the opening in the first projection.

12. The stud spacer assembly of claim 11 wherein the deflector of the first projection deflects the terminal end of the second projection through the opening of the first projection and wherein the deflector of the second projection deflects the terminal end of the first projection through the opening in the second projection.

13. The stud spacer assembly of claim 7 wherein the locking surface includes a tab and the stop includes a tab receiving opening and wherein when the first and second projections are interconnected the first projection is extended over a portion of the second projection and a portion of the first projection is inserted through the opening in the second projection such that the locking tab of the first projection seats within the tab receiving opening formed in the second projection and wherein the second projection is extended underneath a portion of the first projection and a portion of the second projection is inserted through the opening in the first projection wherein the locking tab of the second projection seats within the tab receiving opening of the first projection.

14. The stud spacer of assembly of claim 13 wherein each projection includes a deflector disposed adjacent the tab receiving opening and wherein the deflector on the first projection deflects a portion of the second projection upwardly through the opening in the first projection, and wherein the deflector in the second projection deflects a portion of the first projection downwardly through the opening in the second projection.

15. The stud spacer assembly of claim 7 wherein the locking surface of each projection includes a tab and wherein the stop of each projection includes a tab receiving opening and when the projections are connected the respective tabs are seated within the tab receiving openings.

16. A wall structure, comprising:
   a. a series of spaced apart studs with each stud having an opening formed therein;
   b. a series of stud spacers extending between respective studs;
   c. each stud spacer including first and second projections that extend from opposite ends of the stud spacer, at least one of the projections extending in a generally horizontal plane, the horizontal plane being generally normal to a web of an adjacent stud;
   d. each stud spacer further including first and second pairs of end flanges, the first pair of end flanges formed on a first end of the stud spacer and the second pair of end flanges formed on a second, opposite, end of the stud spacer;
   e. the end flanges of the first pair of end flanges being disposed on opposite sides of the first projection and the end flanges of the second pair of end flanges being disposed on opposite sides of the second projection;
   f. said first and second projections of each stud spacer adapted to connect to first and second projections of other stud spacers so as to interconnect the stud spacers of the wall structure; and
   g. each projection including a locking surface and a locking stop and wherein when interconnected the locking surface of the first projection is engaged with the locking stop of the second projection and the locking surface of the second projection is engaged with the locking stop of the first projection.

17. The wall structure of claim 16 wherein when connected the respective projections at least partially overlie one another.

18. The wall structure of claim 17 wherein the first projection includes a terminal end portion and an opening and the second projection includes a terminal end and an opening and wherein the terminal end portions of the respective projections are projected through the openings within the projections when the projections are interconnected.

19. A method of interconnecting a first stud spacer with a second stud spacer extending between studs in a wall structure wherein the first stud spacer includes a first projection and the second stud spacer includes a second projection, comprising the steps of:
   a. projecting the first and second projections of the first and second stud spacers through an opening in a stud;
   b. projecting the first projection through an opening in the second projection and engaging a locking surface associated with the first projection with a stop associated with the second projection;
   c. projecting the second projection through an opening in the first projection and engaging a locking surface associated with the second projection with a stop associated with the first projection; and
   d. abutting an end flange formed on an end of the first stud spacer to a face of a web of the stud and abutting an end flange formed on an end of the second stud spacer to an opposite face of the web.

20. The method of claim 19 including engaging the first projection with a deflector associated with the second projection and deflecting the first projection through the opening in the second projection, and engaging the second projection with a deflector associated with the first projection and deflecting the second projection through the opening in the first projection.

21. The method of claim 20 including at least slightly bending a portion of each projection as the two projections are interconnected.

22. The method of claim 21 wherein the projections are at least slightly flexed in response to engaging the respective deflectors carried by the projections.

23. The method of claim 19 wherein the locking surfaces comprise locking tabs and wherein the stops comprises locking seats and wherein when the projections are interconnected the locking tabs of the respective projections are seated within the locking seats of the projections.

24. The method of claim 19 including contacting a terminal end of the first projection with a deflector disposed on the second projection and deflecting the terminal end of the first projection downwardly through the opening in the second projection; and contacting a terminal end portion of the second projection with a deflector on the first projection and deflecting the terminal end of the second projection upwardly through the opening in the first projection.

25. The method of claim 24 wherein the locking tabs carried by the first and second projections snap into the tab receiving openings once the terminal ends of the respective projections have been inserted through the openings in the respective projections.

26. The stud spacer assembly of claim 7 wherein each stud spacer includes a web having opposed first and second ends, and wherein each stud spacer includes first and second pairs of spaced apart end flanges, the first pair of end flanges formed on the first end portion of the stud spacer and extending from the first end of the web, and the second pair of end flanges formed on the second end portion and extending from the second end, the end flanges for connecting the stud spacer to a pair of spaced apart studs.

27. The stud spacer assembly of claim 26 wherein each stud spacer includes a pair of spaced apart flanges disposed on each end portion thereof for connecting to one stud.

28. The wall structure of claim 16 wherein each stud spacer includes one or more flanges disposed on opposite end portions for connecting each stud spacer to at least two spaced apart studs that form a part of the wall structure; and wherein each flange is connected to one stud such that the series of stud spacers that form a part of the wall structure are interconnected to the studs.

29. The wall structure of claim 28 wherein each consecutive pair of studs of the wall structure are interconnected by a stud spacer, and wherein the stud spacer includes at least one flange disposed on opposite ends thereof, and wherein each flange is connected to one stud.

30. The method of claim 19 including securing at least one of the first or second stud spacers to the stud.

31. The method of claim 30 wherein each of the stud spacers includes one or more flanges disposed on one or more end portions thereof, and wherein the method includes fastening the one or more flanges of at least one of the stud spacers to the stud thereby interconnecting the stud with at least one of the stud spacers.

32. The stud spacer of claim 1 wherein:
   a. the end flanges are generally co-planar; and
   b. the end flanges and the projection extend from a common end of the main member.

33. The stud spacer of claim 32 wherein the end flanges are configured to abut a web of a stud.

34. The stud spacer of claim 1 wherein the stud spacer includes a pair of generally parallel side flanges extending normally from the main member and from one end of the main member to another end of the main member.

35. The stud spacer of claim 1 wherein the main member includes a web having opposite ends, the projections projecting outwardly from the ends of the web, and the web and the projections are generally co-planar.

36. The stud spacer of claim 1 wherein:
   a. the main member includes a web having opposite ends, the projections project outwardly from the ends of the web, and the web and the projections are generally co-planar;
   b. the stud spacer includes a pair of generally parallel side flanges extending normally from the web of the main member and from one end of the main member to another end of the main member;
   c. the end flanges and the projections extending from common ends of the main member; and
   d. the end flanges on each end portion of the main member are generally co-planar and are configured to abut a web of a stud.

37. The stud spacer assembly of claim 26 wherein the first projection extends between the first pair of end flanges and outwardly from the first end of the web, and the second projection extends between the second pair of flanges and outwardly from the second end of the web.

38. The stud spacer assembly of claim 37 wherein the end flanges of at least one of the pairs of end flanges are co-planar and extend in a direction normal to the web.

39. The wall structure of claim 16 wherein a portion of at least one of the studs is sandwiched between one of the end flanges of one of the stud spacers and one of the end flanges of another of the stud spacers.

40. The method of claim 19 wherein projecting the first projection into an opening in the second projection includes extending together the first projection and the second projection between end flanges of pairs of end flanges formed on respective ends of two of the stud spacers.

41. The stud spacer of claim 7 wherein the stud spacer comprises an elongated substantially planar web and pair of side flanges extending at angles from the web and disposed on opposite sides of the web, and wherein at least one of the projections lies generally in a plane that is perpendicular to the web of the stud spacer.

* * * * *

UNITED STATES PATENT AND TRADEMARK OFFICE
CERTIFICATE OF CORRECTION

PATENT NO.       : 7,596,921 B1                                         Page 1 of 1
APPLICATION NO. : 10/701190
DATED            : October 6, 2009
INVENTOR(S)      : diGirolamo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Twenty-eighth Day of September, 2010

David J. Kappos
*Director of the United States Patent and Trademark Office*